United States Patent
Neuhaus

(10) Patent No.: US 7,481,416 B2
(45) Date of Patent: Jan. 27, 2009

(54) VALVE

(76) Inventor: Dietmar Neuhaus, Kaiserslauterner Strasse 32, 40591 Duesseldorf (DE)

( * ) Notice: Subject to any disclaimer, the term of this patent is extended or adjusted under 35 U.S.C. 154(b) by 407 days.

(21) Appl. No.: 10/583,123

(22) PCT Filed: Dec. 2, 2004

(86) PCT No.: PCT/EP2004/013711

§ 371 (c)(1),
(2), (4) Date: Jun. 16, 2006

(87) PCT Pub. No.: WO2005/064215

PCT Pub. Date: Jul. 14, 2005

(65) Prior Publication Data

US 2008/0290304 A1    Nov. 27, 2008

(30) Foreign Application Priority Data

Dec. 19, 2003  (DE) ................................ 103 59 852

(51) Int. Cl.
*F16K 31/02* (2006.01)
(52) U.S. Cl. .............................. 251/129.14; 251/129.19
(58) Field of Classification Search ............ 251/129.14, 251/129.15, 129.19
See application file for complete search history.

(56) References Cited

U.S. PATENT DOCUMENTS

| 3,543,797 | A |   | 12/1970 | McNutt et al. |
| 4,682,508 | A |   | 7/1987 | Steiner et al. |
| 5,037,062 | A | * | 8/1991 | Neuhaus ...................... 251/76 |
| 5,322,260 | A |   | 6/1994 | Forbes et al. |
| 5,810,330 | A | * | 9/1998 | Eith et al. .............. 251/129.19 |
| 5,967,485 | A |   | 10/1999 | Neuhaus |
| 6,085,772 | A | * | 7/2000 | McGill et al. ................. 137/39 |
| 6,899,314 | B2 | * | 5/2005 | Ott ........................ 251/129.14 |

FOREIGN PATENT DOCUMENTS

| DE | 19922414 C1 | 11/2000 |
| DE | 20015703 U1 | 3/2001 |
| EP | 1052441 B1 | 3/2004 |

* cited by examiner

*Primary Examiner*—John K Fristoe, Jr.
(74) *Attorney, Agent, or Firm*—Fulwider Patton LLP

(57) ABSTRACT

The valve comprises a closing body in a valve chamber. The valve chamber is delimited on one end by an opposing wall and on the opposite end by a piston. The piston is pressed in the direction of the opposing wall by a press-on means. In this manner, the closing body is pressed against a centering seat axially aligned with the valve seat. The press-on means makes it possible that the valve will reliably close also in case of a small pressure differential between the valve inlet and the valve outlet.

8 Claims, 2 Drawing Sheets

VALVE

RELATED APPLICATIONS

Figure 1:
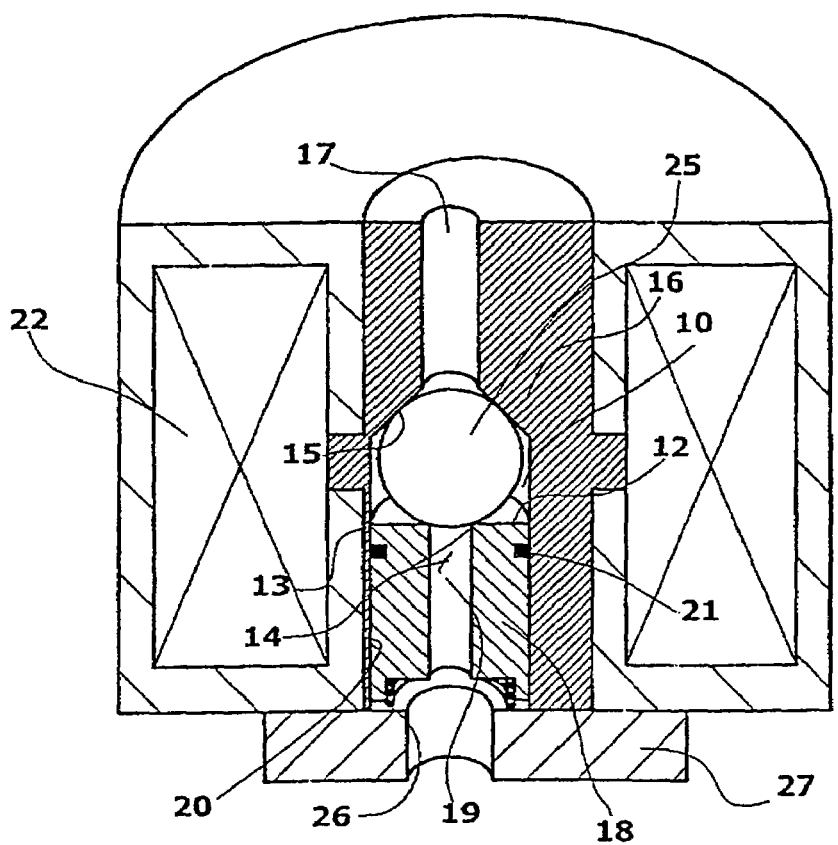

This application is a U.S. national phase of PCT/EP04/013711, filed Dec. 2, 2004, which claims priority from German Application No. 10359852.9, filed Dec. 19, 2003.

The invention relates to a valve for fluids, comprising a valve chamber connected to a valve inlet and a valve outlet and delimited by a valve seat and an opposing wall, and further comprising a movable closing body arranged in the valve chamber.

A magnetically operated valve of the above type is described in DE 199 22 414 C1 of the present applicant. This valve comprises a closing body formed as a ball which, by excitation of a magnetic field, can be dislodged from the valve seat so as to open the valve. Upon termination of the excitation, the closing body is caused, merely under the influence of the flow passing through the valve chamber, to move back onto the valve seat so as to close the valve. The valve will be closed only if the pressure differential between the inlet and the outlet is large enough to the effect that the resultant flow can move the closing body in the direction of the valve seat. This means that, between the valve inlet and the valve outlet, a sufficiently large pressure differential is required in order to allow for a correct operation of the valve.

A similar valve is described in DE 198 00 257 C1 of the applicant. Also in this valve, the return movement of the closing body into the closing position necessitates a fluid flow.

A valve forming the basis of the precharacterizing part of claim 1 is described in DE 44 18 129 A1. This valve includes a ball fastened to a piston. The piston is pressed by a spring against a truncated valve seat, with the ball closing the inlet opening of the valve. A part of the piston is surrounded by a magnet coil so that, in the state of excitation, the piston will be axially displaced together with the ball and the inlet opening will thus be opened. The piston is arranged, in coaxial orientation with the magnet arrangement, in a corresponding cylinder so that the ball is allowed to be moved only axially relative to the valve seat.

Described in DE 20 15 703 U1 is a device for testing the leak-tightness of valves, which device comprises a diaphragm pump. The diaphragm is provided with an attachment forming the valve body which, by means of a magnet core, is pressed against a valve seat. Both the magnet core and the valve seat are arranged coaxially to a magnet coil provided to move the magnet core.

It is an object of the invention to provide a valve adapted to open quickly with only little movement, wherein it is safeguarded that the valve will reliably close also in case of a small pressure differential between the valve inlet and the valve outlet.

The valve of the invention is defined by claim 1. According to this claim, it is provided that the closing body is movable separately from the opposite wall and that the diameter of the closing body is distinctly smaller than the diameter of the valve chamber so that the closing body can move laterally in the valve chamber.

Consequently, the valve body, which is directly acted on by the magnetic device, can move laterally in the valve chamber so that already a small movement will suffice to quickly clear a large cross-sectional area of the flow. If the valve body is provided as a ball, this ball can roll on a funnel-shaped centering seat arranged opposite from the valve seat.

Thus, the valve chamber is variable in its length, and a press-on means is provided for biasing the valve chamber in the direction of the shortest length, the closing body being clamped between the valve seat and the opposing wall and therefore being pressed against the valve seat by the opposing wall. When the pressure at the valve is increased, the force of the press-on means will be overcome and, since the valve seat (or the opposing wall) will retreat against the force of the press-on means, the length of the valve chamber will be extended. The valve body then remains on the valve seat while, however, moving farther away from the opposing wall.

Therefore, also in case of extremely small pressure differentials, the valve of the invention will quickly reach its closed position when the external excitation which caused the movement of the opened state has been terminated.

Basically, the possibility exists to arrange the valve seat to be displaceable together with the opposing wall. However, as an alternative thereto, it can be provided that only the valve seat or only the opposing wall is displaceable. What is of importance is only that the length of the valve chamber is variable vertically to the plane of the valve seat wherein a tensioning force is acting in a direction towards a reduction of the length.

In a preferred embodiment of the invention, the opposing wall comprises a centering seat arranged to support the closing body. The centering seat is aligned with the axis of the valve seat and causes the closing body to be aligned with this axis so that the closing body can impinge on the valve seat and fill the valve seat in a precise manner.

Preferably, the closing body comprises a ball, and the centering seat comprises a funnel.

The valve can be provided as a single valve or as a multiple valve. In a multiple valve, seats of plural valve chambers can be arranged on a common movable piston. In such an arrangement, all valves will be closed simultaneously by the movement of the piston.

Embodiments of the invention will be explained in greater detail with reference to the drawings. It is to be understood that the protective scope of the invention is not restricted to the illustrated embodiments. Instead, the protective scope is defined by the claims and their equivalents.

IN THE DRAWINGS

Figure 2:
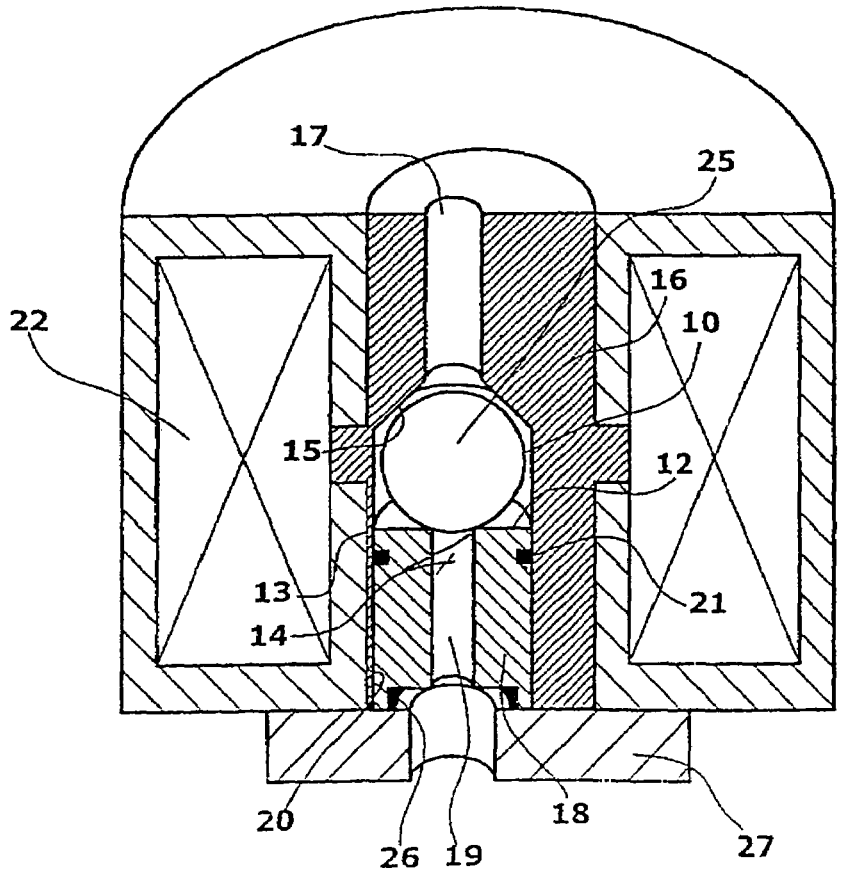
Figure 3:
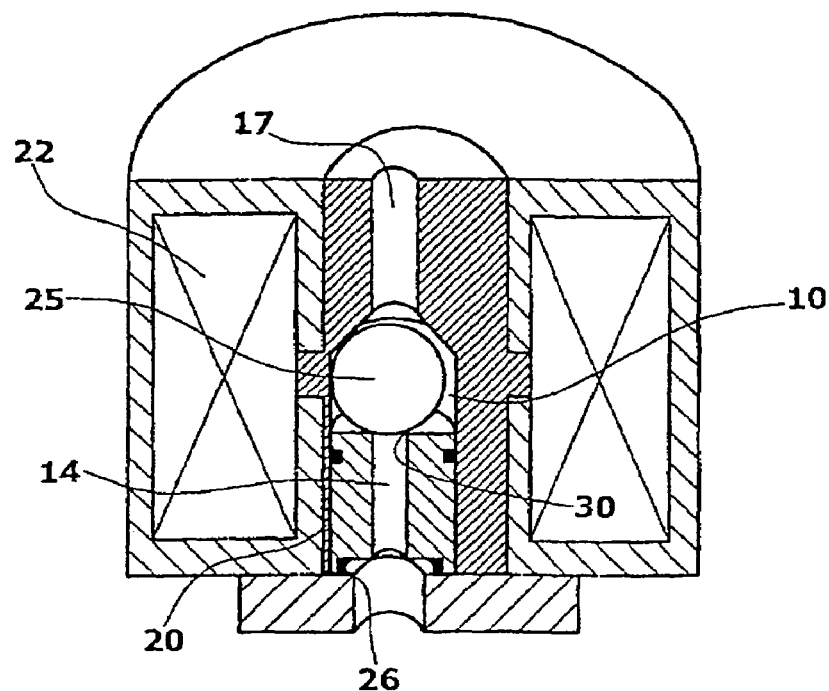
Figure 4:
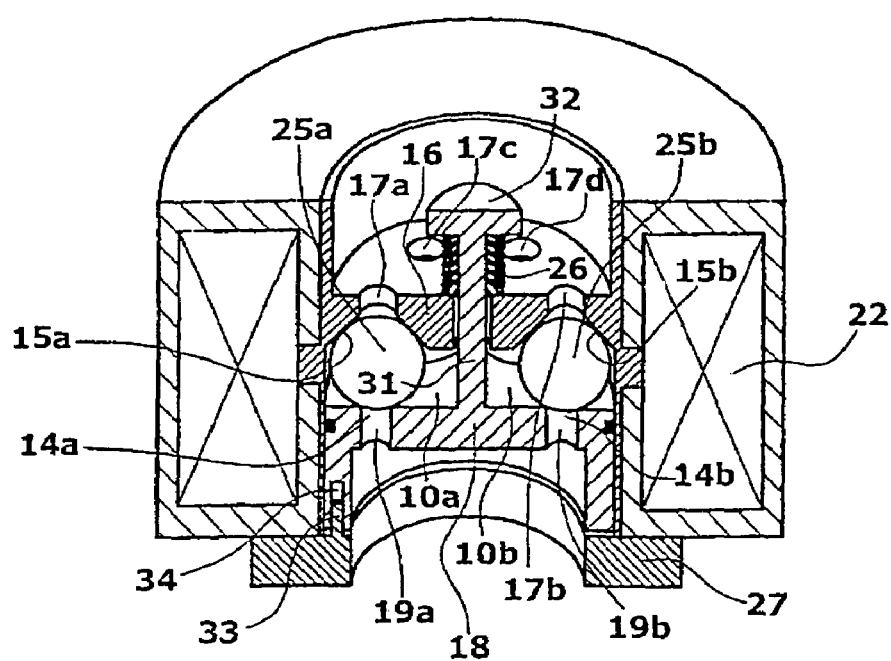

FIG. 1 is a longitudinal sectional view of a first embodiment of the valve in the closed state at a small pressure differential between the valve inlet and the valve outlet, FIG. 2 is a view of the valve according to FIG. 1 at a higher pressure differential in the closed state, FIG. 3 is a view of the valve according to FIG. 1 in the opened state, and FIG. 4 is a view of a second embodiment of the valve which is here illustrated as a multiple valve.

The valve illustrated in FIGS. 1-3 is a magnetically operated valve. The valve comprises a valve chamber 10 which is generally of a cylindrical configuration and is delimited on one end by an opposing wall 16 and on the other end by a valve seat wall 12. The peripheral wall comprises a cylindrical shell. Valve seat wall 12 accommodates a valve seat 14 formed as a round opening.

Provided in the opposing wall 16 is a funnel-shaped centering seat 15 which is aligned coaxially to valve seat 14. The opposing wall 16 comprises a through bore forming the valve inlet 17.

Valve seat wall 12 and valve seat 14 are components of a piston 18 which comprises a through bore forming the valve outlet 19. Piston 18 is guided to move in a cylinder 20 in a sealed manner, the sealing effect being obtained by an annular seal 21. The opposing wall 16 is formed integrally with the wall of cylinder 20. The cylinder 20 is surrounded by a toroidal coil body including an electromagnetic device 22 which will generate a magnetic field for moving the closing body 25 arranged in valve chamber 10. The closing body 25 is a ball of ferromagnetic material. The diameter of the ball is distinctly smaller than the diameter of valve chamber 10, thus allowing the ball to move laterally in the valve chamber.

The opposing wall 16 in this embodiment is arranged fixedly in the magnetic device while the piston 18 is axially movable relative to valve seat 14. Piston 18 is biased in the direction towards opposing wall 16 by a press-on means 26 which here is formed as a pressure spring. Press-on means 26 is supported on a flange 27 connected to the magnetic device.

In the pressureless state according to claim 1, piston 18 is displaced against the opposing wall 16 by the action of press-on means 26. Thereby, the closing body 25 is pressed against the centering seat 15 and is centered by the latter. Thus, it is safeguarded that the closing body will close the valve seat 14 in a precise manner.

The common axis of valve seat 14 and centering seat 15 extends eccentrically to the axis of cylinder 20 and the magnetic device 22, respectively.

FIG. 2 shows the valve with a pressure differential between valve inlet 17 and valve outlet 19 which is sufficient to move the piston 18 away from opposing wall 16 against the force of press-on means 26. The press-on means 26 is in its compressed state, and the closing body 25 can be rolled off the valve seat 14 by the effect of the magnetic field.

In FIG. 3, the valve is shown in the opened state. A magnetic field has rolled the magnetic closing body 25 laterally off the valve seat 14 and laterally against the wall of cylinder 20 so that the ball is not fully seated on valve seat 14 anymore. In the opened state, a passage 30 exists between closing body 25 and valve seat 14.

FIG. 4 illustrates an embodiment of a multiple valve with two mutually adjacent valve chambers 10a,10b which each have a spherical closing body 25a,25b arranged therein. Each closing body 25a,25b serves for opening and closing a valve seat 14a,14b. The valve seats are provided on a common piston 18 provided with respective valve outlets 19a,19b. The opposing wall 16 comprises two centering seats 15a,15b for respectively one of the closing bodies 25a,25b. Piston 18 is provided with a bar 31 passing through a bore of opposing wall 16 and having its end provided with a support flange 32. The press-on means 26 is supported on the outer side of opposing wall 16 and on the support flange 32. Thus, the spring means presses the piston 18 in the direction towards opposing wall 16 whereby the closing bodies 25a,25b are pressed into the respective centering seat 15a,15b and consequently are centered with respect to the axis of the valve seat 14a,14b. When the intake pressure of the valve presses the piston 18 away from opposing face 16, the closing bodies 25a,25b can move freely, allowing the valve to be controlled by the magnetic device 22. The same magnetic device is used for simultaneously controlling all of the closing bodies.

In FIG. 4, only two closing bodies 25a,25b are visible. Further closing bodies can be arranged in a circle. For this purpose, still further valve inlets 17c and 17d, apart from valve inlets 17a and 17b, are provided in opposing wall 16. Assigned to each valve inlet is a valve chamber with a closing body. The valve chambers can be connected among each other.

To keep the valve seats in their correct alignment with the centering seats, piston 18 is secured against rotation. This is realized in that the flange 27 is provided with a centering pin 33 projecting into a corresponding bore 34 of piston 18 so that the piston can be axially displaced and at the same time is axially guided. The multiple valve according to FIG. 4 offers the advantage that the fluid flows of the individual valves add up to each other so that the valve can be controlled to allow the passage of a larger volume flow.

What is claimed is:

1. A valve for fluids, comprising a valve chamber connected to a valve inlet and a valve outlet and delimited by a valve seat and an opposing wall, and comprising a movable closing body included in the valve chamber, and a magnetic device, the valve seat or the opposing wall being displaceable vertically to the seat plane and resiliently biased in the direction of the closing body in such a manner that the closing body contacts both the valve seat and the opposing wall without application of an external force, wherein the closing body is movable separately from the opposing wall and that the diameter of the closing body is distinctly smaller than the diameter of the valve chamber so that the closing body is allowed to move laterally in the valve chamber.

2. The valve according to claim 1, wherein the opposing wall comprises a centering seat supporting the closing body.

3. The valve according to claim 2, wherein the closing body is a ball and that the centering seat comprises a funnel.

4. The valve according to claim 1, wherein the valve seat is provided on a piston guided in a cylinder in a sealed manner.

5. The valve according to claim 1, wherein the cylinder is formed integrally with the centering seat.

6. The valve according to claim 1, wherein the valve chamber is arranged eccentrically to the axis of the magnetic device surrounding the valve chamber.

7. The valve according to claim 1, wherein the valve seats of a plurality of valve chambers are arranged on a common movable piston.

8. The valve according to claim 7, wherein the piston is provided with an anti-rotation device.

* * * * *